United States Patent
Ellis

[15] 3,698,052
[45] Oct. 17, 1972

[54] VARIABLE POSITIONING MEANS
[72] Inventor: Walter S. Ellis, Troy, Mich.
[73] Assignee: Schulze & Burgess Company, Mount Clemens, Mich.
[22] Filed: April 16, 1971
[21] Appl. No.: 134,636

[52] U.S. Cl. .................... 29/38 C, 408/14, 90/11 R, 90/14
[51] Int. Cl. ............................................. B23p 23/00
[58] Field of Search .......... 29/33 P, 38 C, 38 A, 38 B, 29/563, 564; 90/11 E, 14; 408/14

[56] References Cited

UNITED STATES PATENTS

| | | | |
|---|---|---|---|
| 3,589,219 | 6/1971 | Parsons | 408/14 |
| 2,145,310 | 1/1939 | Lewis et al. | 29/38 A |
| 1,449,464 | 3/1923 | Van Hamersveld | 29/38 A |

*Primary Examiner*—Gil Weidenfeld
*Attorney*—Fisher & Schmidt

[57] ABSTRACT

In a machine having a frame and a moveable table mounted on the frame, the moveable table having a plurality of workpiece carrying stations that are moveable to serially locate each station adjacent a tool mounted on a crosslide on the frame for operation on the workpiece at the station. The machine is provided with variable positioning means for limiting movement of the tool a predetermined distance relative to each of the workpieces at the operating station. The variable positioning means includes a reference device mounted on the crosslide and in fixed location relative to the tool, and a movement limiting device for each of the workpiece stations and adapted to be engaged by the reference device at the end of the tool operation. The limiting devices are equal in number to the number of workpiece stations and each may be dimensioned in accordance with the workpiece mounted at the station. Thus, variances in tolerance stackup and movement in the machine itself will be accommodated for each workpiece station and the workpiece mounted thereon. Means are provided to move the limiting devices into adjacent relation to the reference device as the machine table is moved to place a different station adjacent the crossslide. Further means are provided to prevent retrograde movement of the limiting devices as they are moved from station to station.

15 Claims, 6 Drawing Figures

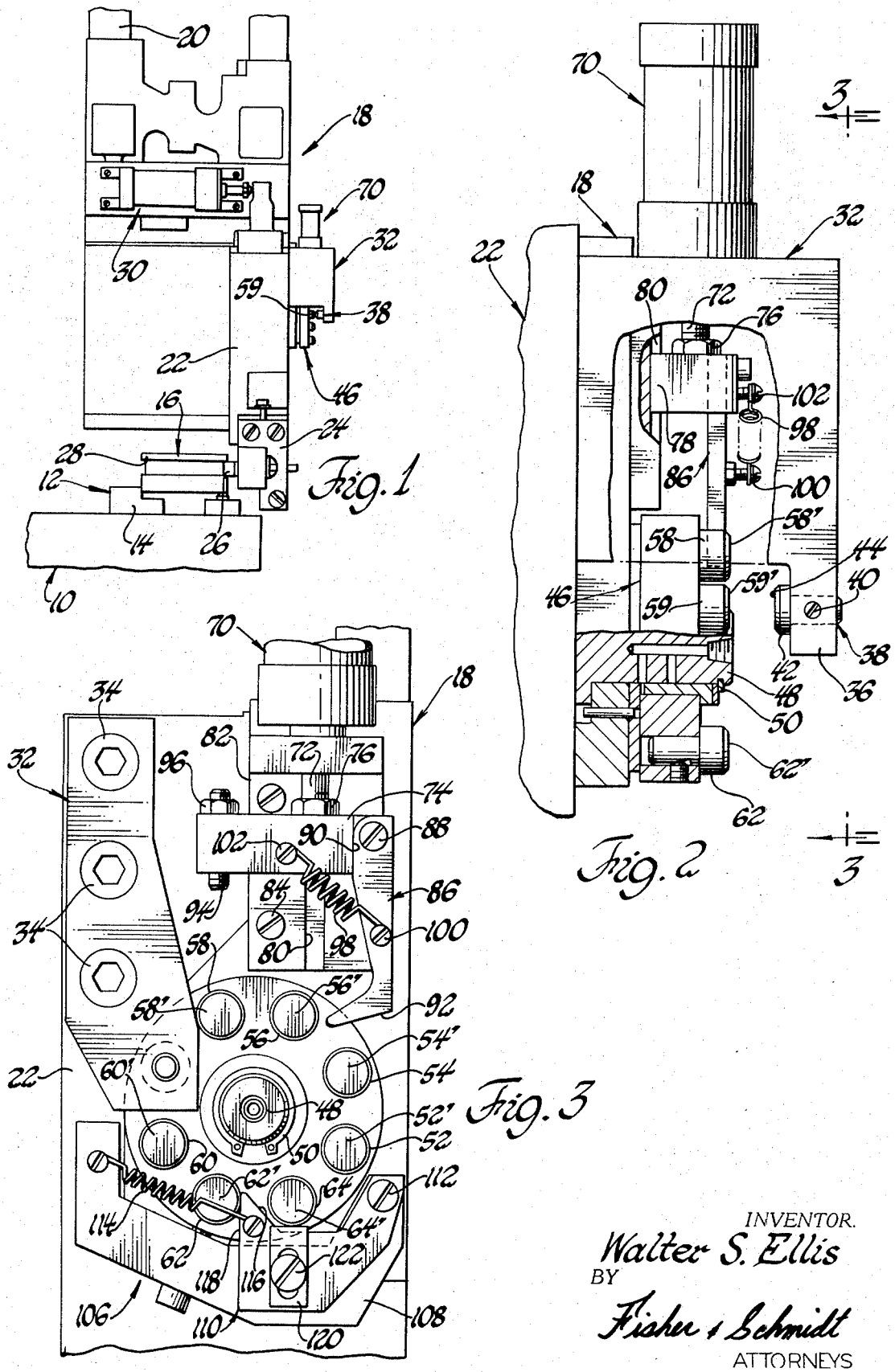

INVENTOR.
Walter S. Ellis
BY
Fisher & Schmidt
ATTORNEYS

VARIABLE POSITIONING MEANS

This invention relates to multiple workpiece station machines of the type wherein a plurality of workpiece stations are serially moveable to positions adjacent a tool mounted for operation on a workpiece, and more particularly, to variable positioning means mounted on such machine to serially and independently limit the movement of the tool in its operation relative to each of the plurality of workpieces at the tool station.

There are many types and styles of production machinery used for carrying out operations on workpieces and wherein the workpieces are mounted on a moveable table of some design and moveable serially into position adjacent a tool. In such machinery, the particular tool will perform a particular operation on each workpiece as the workpiece is stationed adjacent the tool. Following the completion of such machining operation, the moveable table is indexed to place the next workpiece adjacent the tool for the same operation. In this manner, a machine may have six or eight workpiece stations where perhaps six or seven operations may be carried out simultaneously, one at each such station, and having one or two stations for loading and unloading the workpieces. At each of the tool operating workpiece stations, the same operation is carried out, the tool being conveniently mounted on a crossslide or the like for movement relative to the workpiece. As the table indexes, each tool begins anew to carry out its operation on its adjacent workpiece.

With such types of machinery, there are normally a considerable number of parts required to index the table and the workpieces from station to station. It has been found that because of such number of parts, because of tolerance stackup, because of wear on the various parts and for numerous other reasons, there can be a considerable error in the indexing or location of each workpiece at a particular station. In other words, although the movement of the tool is generally the same for adjacent workpiece stations, the positioning of the adjacent workpieces relative to such tool will be different because of indexing error in the machine. Thus, the machine operation carried out by each particular tool at each station will result in variances between the workpieces operated on at each station.

It is the usual practice in operation of machines of this type to live with this, commonly called "index error," to adjust the tool or workpiece stations to overcome such variances. While considerable effort can be made to precisely fix and locate the various moving parts that index the moving table, and since there are so many moving parts with consequent tolerance stackups and availability of wear, it is extremely difficult to do anything other than to accept the index error and produce workpieces with the consequent differences.

It is here proposed to provide a means for accommodating the index error in such machines by providing a variable positioning device on the machine and the tool carrying cross-slide, such that the movement of the tool into the work is limited by stop means tailored to the particular workpiece station on which the tool is operating and which may be different from any other workpiece station. The structure in which this invention is embodied comprises, generally, a fixed reference device mounted on the crossslide and having a member in fixed location and dimension relative to the tool which will carry out the machining operation; a movement limiting member mounted on the machine frame for engagement by the reference device to limit movement of the crossslide and tool, the member being dimensioned for the particular workpiece station and workpiece upon which such tool is operating; and means to index the movement limiting members with indexing of the workpiece table. When one workpiece is indexed and the next workpiece is located adjacent such tool, a differently dimensioned movement limiting means is located for engagement by the reference device and dimensioned to accommodate the index error.

Such variable positioning means mounted on a machine of the type and style above described permits greater precision in production manufacture of workpieces with ease and facility. The device may be mounted on existing machines to eliminate a great deal of the index error in such machines, and thus turn out workpieces that are more uniform and reduce the tolerance limits required of such production manufacturing. The device is operable in connection with the machine so that mechanical operation in indexing the workpiece table also indexes the variable movement limiting devices, thereby assuring that at each workpiece station the proper tool movement is achieved. The device has relatively few parts which are simply assembled and mounted and the overall result is a more efficient machine and more efficient production operation.

These and other advantages will become more apparent from the following description, used to illustrate preferred embodiments of the invention when taken with the accompanying drawings in which:

FIG. 1 is a partial elevational view of a machine having variable positioning means embodying the invention mounted thereon;

FIG. 2 is an enlarged view of a portion of the structure illustrated in FIG. 1, with parts broken away and in section to illustrate the positions of the various parts;

FIG. 3 is an enlarged view of the variable positioning means illustrated in FIGS. 1 and 2, taken substantially along the line 3—3 of FIG. 2 and looking in the direction of the arrows;

Figure 4:
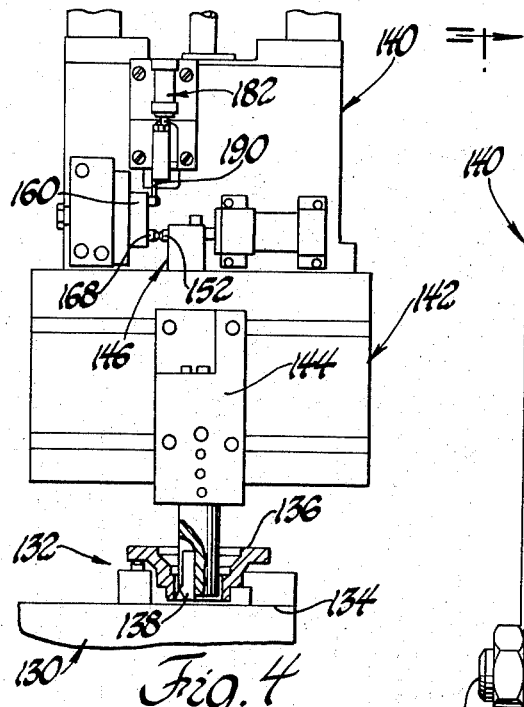
FIG. 4 is a view similar to FIG. 1, showing a modification of the variable positioning means mounted on a portion of a machine.

Referring more particularly to the drawings, where the showings are for the purpose of illustrating preferred embodiments of the invention only and not for purposes of limiting same, FIG 1 best illustrates the pertinent overall structure of a machine of the type with which the invention is associated. As illustrated in FIG. 1, the machine includes a table indicated, generally by the numeral 10, which is rotatable about a machine frame (not shown) in the well-known manner and which has a plurality of workpiece stations, indicated generally by the numeral 12, uniformly spaced around the table 10. Workpiece station 12 may include a chuck assembly 14 in which is suitably mounted a workpiece, indicated by the numeral 16 and on which a machine operation is to be carried out.

Located above the table 10 are a plurality of work stations, and which is indicated generally by the numeral 18, and including a frame structure 20 on which is mounted a moveable crossslide, indicated generally by the numeral 22. Crossslide 22 contains a tool carrier assembly 24 in which is mounted a suitable tool 26 for operation on the workpiece 16, as for example to cut the groove indicated by the numeral 28. The crossslide 22 is mounted for movement in a horizontal direction as viewed in FIG. 1 so that the tool 26 traverses into the workpiece 16.

At the upper end of the crossslide 22 may be mounted an hydraulic movement retarding device, indicated generally by the numeral 30, by which the movement of the crossslide 22 is controlled.

The portion of the machine thus far described is generally well known in the art and in the typical arrangement there may be six such tool stations mounted about the periphery of the overall machine. At each tool station a different operation may be carried out on a workpiece, although for each workpiece coming to a particular station, it is to be understood that the particular tool carries out the same operation at that station. Thus, workpiece 16, as illustrated in FIG. 1, upon completion of the machining operation by the tool 26 to cut the groove 28, would be next indexed to another similar tool station where a different machining operation would be carried out and a second workpiece and workpiece station mounted on the table 10 would be indexed into position adjacent the tool 26 for purposes of cutting a groove 28 in the next workpiece. As the table 10 is indexed to place adjacent stations opposite the tool 26, the mechanical linkages and machinery which accomplish this purpose may position the next workpiece slightly differently relative to the cutting edge of tool 26, then the previous workpiece. If such positioning is slightly different, there will be a difference in the dimension or location of the groove 28 cut in the next workpiece as compared to the workpiece 16. It is the index error thus described that this invention seeks to accommodate.

With reference now to FIGS. 2 and 3, as well as FIG. 1, there is shown mounted on the crosspiece 22 a button carrier, indicated generally by the numeral 32, secured to the crossslide as by a plurality of bolts 34. Mounted in a downwardly depending portion 36 of the carrier 32 is a button, indicated generally by the numeral 38 and secured in position in the carrier 32 as by a set screw 40. Button 38 includes an enlarged head 42 having an inwardly disposed face 44 for purposes to become hereinafter more apparent. It is sufficient to note at this point that the face 44 is in fixed location relative to the tool 26 in the crossslide 22.

Rotatably secured on the machine frame structure 20 is a rotatable member, indicated generally by the numeral 46 and secured in any suitable manner on a central shaft 48, as by a snap ring 50. The rotatable member 46 has received therein a plurality of buttons, indicated by the numerals 52–64, such buttons being circumferentially mounted on the rotatable member 46 and each of which has an outwardly directed engaging face 52'–64' respectively. The outwardly directed faces 52'–64' are directed toward the face 44 on the reference button 38 for purposes to become hereinafter more apparent.

As best seen in FIG. 2, a button 59 on the rotatable member 46 is disposed in aligned and spaced relation to the reference button 38 in the carrier 32. Button 59 is associated with workpiece 16 in the chuck 14 on the table 10, and each of the remaining buttons 52–64 is associated with one of the other workpieces on the table 10 and not shown.

Since the carrier 32 is moveable with the crossslide 22 and the tool 26, it will be apparent that the face 44 of the reference button 38 will move toward the face 59' of the button 59 as the tool 26 carries out its grooving operation on the workpiece 16. Button 59 is axially dimensioned so that at the proper depth of cut of the tool 26, faces 44 and 59' will come into engagement to stop leftward movement of the crossslide 22 and the tool 26. Since the face 44 of the reference button 38 is in fixed and known relation relative to the tool 26, and since the buttons 52–64 and their faces 52'–64' are in fixed relation relative to the workpiece with which each is associated, it is apparent that for every operation at that particular station the movement of the tool 26 and the crossslide 22 will be limited by the engagement of the faces 44 and 52'–64' on the adjacent buttons.

When the grooving operation is completed by the tool 26 on the workpiece 16, the table 10 is indexed to place a next adjacent workpiece into position for operation by the tool 26. It is thus necessary to position a next button adjacent to the reference button 38 and engaging face 44 which is suitably dimensioned for that particular workpiece station and which may be different from the button 59 and its dimension to the engaging face 59'. For this purpose, means are provided to rotate the rotatable member 46 in conjunction with indexing of the table 10. Suitably mounted on the frame 20 is an hydraulic cylinder indicated generally by the numeral 70 and which may be of any type well known in the prior art and which is operably connected to the machinery for indexing the moveable table 10. A piston rod 72 extends downwardly from piston, (not shown) in the cylinder 70, is secured to a block 74 and held in place as by a nut 76. Block 74 has a rearwardly extending flange 78 receivable in the groove 80 formed in a mounting block 82. Mounting block 82 is secured to the frame structure in any suitable manner as by machine screws 84.

Mounted on block 74 is a finger, indicated generally by the numeral 86, which is rotatable on the block 74 and pivots around a machine screw or the like 88 extending through the finger 86 and into the block 74. A shoulder 90 on the block 74 limits rotation in a clockwise direction, as viewed in FIG. 3, of the finger 86 to the position illustrated in the drawing. The lower end of finger 86 is provided with an engaging surface 92 for engagement with a button, as button 54, on the rotatable member 46.

At the opposite end of block 74 is a stop member 94 which may be in the form of a threaded stud extending downwardly from the block 74 and secured in place by a nut or the like 96. Also secured in the block 74 is a spring 98 extending to the finger 86 and secured thereto by a machine screw or the like 100, the spring biasing the finger into the position illustrated in FIG. 3.

As the piston (not shown) is moved downwardly in the cylinder 70 in the manner well known in the art, the block 74 is moved downwardly as viewed in FIGS. 2 and 3 so that the surface 92 of the finger 86 engages the button 54 on the rotatable member 46. Continued downward movement of the block 74 causes the rotatable member 46 to rotate, moving button 59 out of position relative to reference button 38 and causes the button 60 to be rotated into position adjacent the reference button 38 in the carrier 32. Completion of movement is stopped by the stop member 94 engaging the adjacent button, as button 59 which would then be in such position beneath the stop member 94.

As the piston is returned to its upward position in the cylinder 70, the block 74 is likewise moved upwardly and an inclined surface 102 on the lower end of the finger 86 engages the button 56, which is now rotated to the position of button 54, and causes the finger 86 to rotate in a counter clockwise direction against the force of spring 98 and out of engagement with the button 56 on the rotatable member 46. Thus, the block 74 and the finger 86 are moved upwardly to a position to begin the next cycle.

In order to prevent retrograde movement of the rotatable member 46 in a counter clockwise direction as the finger 86 is returned to its upper position, the assembly illustrated at 106 is provided. Assembly 106 includes a mounting member 108 fixedly secured on the frame portion 20 in any suitable manner and has mounted thereon a finger, indicated generally by the numeral 110. Finger 110 is pivotally, on the member 108 in any suitable manner, as by machine screw 112, and a spring 114 secured in the member 108 and in the finger 110 biases the finger 110 into a position such as illustrated in FIG. 3. Finger 110 includes an inclined surface 116 and an engaging surface 118, so disposed that when the upper finger 86 causes rotation of the rotatable member 46, the button 64 engages the inclined surface 116 and pivots the finger 110 in a counter clockwise direction, as viewed in FIG. 3, and out of engagement with the button 62. As the button 64 continues its rotation and passes the juncture between surfaces 116 and 118, the finger 110 will be returned upwardly by the spring 114 so that when properly positioned the button 64 will engage the surface 118 of the finger 110. The upper finger 86 may then be moved upwardly and rotated outwardly by its inclined surface 102 and the surface 118 and finger 110 will prevent the rotatable member 46 from retrograde movement in a counter clockwise direction.

A stop member 120 may be mounted on the lower finger 110 to engage the adjacent button, as button 64, when the finger 110 is in its proper at rest position. Stop member 120 may be held in place in any suitable manner as by machine screw 122.

Figure 5:
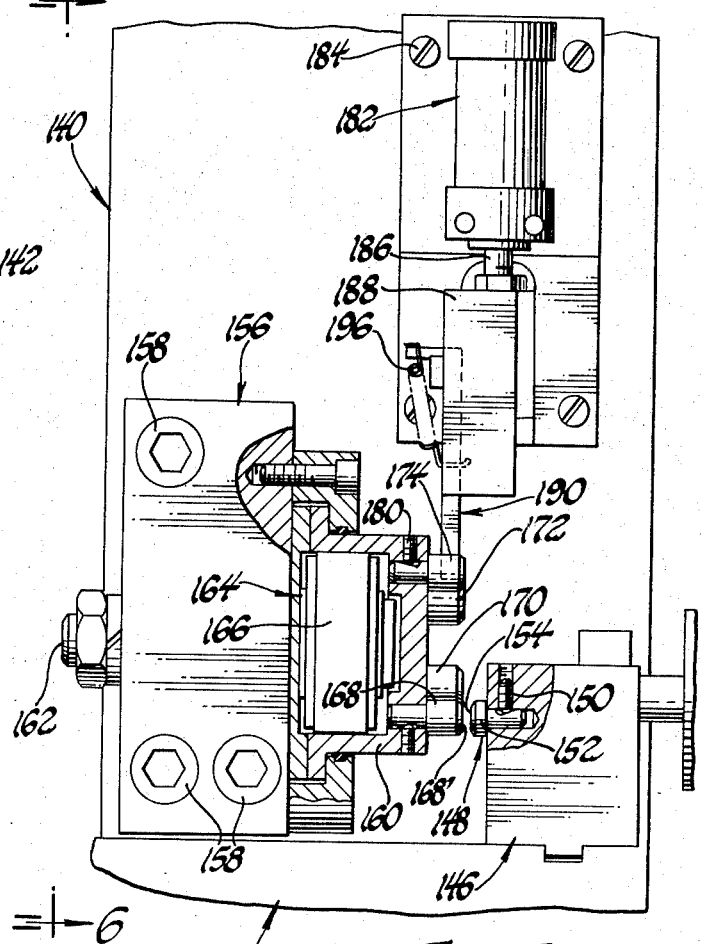
FIG. 5 is an enlarged elevational view of a portion of the structure illustrated in FIG. 4, with parts broken away and in section to illustrate the positions of the various parts.
Figure 6:
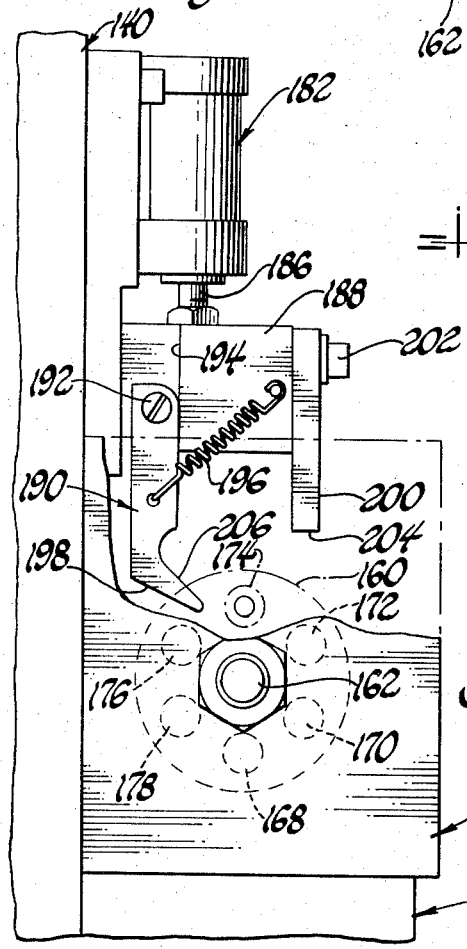
FIG. 6 is a side view of a portion of the structure illustrated in FIG. 4 and 5, taken substantially along the lines 6—6 of FIG. 5 and looking in the direction of the arrows.

Referring now to FIGS. 4-6 a modification of the variable positioning device is illustrated, and in which a machine is provided with a rotatable table, indicated generally by the numeral 130, having a workpiece station, indicated generally by the numeral 132 on which is located a chucking device 134. A workpiece 136 may be mounted in the chucking device 134 for operation by a suitable tool 138 which, in the instance shown, is a boring bar adapted to form an inner groove in workpiece 136. The machine frame, indicated generally by the numeral 140, has mounted thereon a crossslide 142 which receives the tool holding mechanism 144 in rigid and fixed relation. The crossslide 142 carries the tool 144 in a horizontal direction, as viewed in FIG. 4, relative to the frame structure 140.

A reference button carrier, indicated generally by the numeral 146 is mounted on a crossslide 142 and has secured therein a reference button, indicated generally by the numeral 148. Button 148 may be held in the carrier 146 in any suitable manner as by set screw 150. Reference button 148 includes an enlarged head 152 with an engaging face 154 and the face 154 is in fixed location relative to the tool 138 as heretofor described. A mounting block 156 is secured in the machine frame 140 in any suitable manner, as by bolts 158, and rotatably secured in the block 156 is a rotatable member 160. Within member 160 and on the shaft 162 is a clutch assembly, indicated generally by the numeral 164 and which is of a type well known in the prior art. The outer race mechanism 166 of clutch 164 is in engagement with the inner surface of the rotatable member 160 for movement therewith.

Mounted in the rotatable member 160 are a plurality of buttons, indicated by the numerals 168-178, each of which corresponds to a workpiece station, as station 132, on the rotatable table 130. Buttons 168-178 are provided with outwardly facing engageable faces 168'-178' and when each button is properly positioned, such face is adapted to be engaged by the face 154 on the reference button 148. Buttons 168-178 may be secured in the rotatable member 160 in any suitable manner as by set screws 180.

As has been previously described, when the tool 138 completes its operation on the workpiece 136 at a particular station, the reference button face 154 will engage the face 168' of the adjacent button 168 to limit the cutting movement of the tool 138. As the worktable 130 is indexed to place a next workpiece station adjacent the tool 138 for operation thereby, the rotatable member 160 is indexed to place the next button 170 on the rotatable member 160 in axial alignment with the reference button 148. Each of the reference buttons 168-178 is axially dimensioned in accordance with its particular work station to take up the index error built into the machine as the table 130 indexes station by station to the tool 138.

In order to index the rotatable member 160 as the table 130 is indexed, an hydraulic cylinder, indicated generally by the numeral 182 and of a type well known in the prior art, is secured to the machine frame structure as by machine screws or the like 184. A piston (not shown) moves in the cylinder 182 and has a piston rod 186 depending therefrom and secured to a reciprocable block 188. Mounted for rotational movement on the block 188 is a finger, indicated generally by the numeral 190, pivotally mounted on the block 188 by a machine screw or the like 192. A shoulder 194 limits rotational movement of the finger 190 in a counter-clockwise direction to the position shown in FIG. 6. The spring 196, secured to the block 188 at one end and to the finger 190 at the opposite end, biases the finger 190 in a counter-clockwise direction. At the lower end of finger 190 is an engaging surface 198 which is adapted to engage the adjacent button 176 on the rotatable member 160 such that as the piston is moved downwardly in the cylinder 182 and the block 188 is carried downwardly, the finger surface 198 engages the button 176 and rotates the rotatable member 160 to a next position. A stop member 200, secured on the block 188 as by bolt 202, has a lower engaging surface 204 which engages one of the buttons, as button 170, when the finger 190 is moved to its lower most position.

As the piston in the cylinder 182 is moved to its upward position, carrying the block 188 and the finger 190 therewith, an inclined surface 206 on the finger 190 engages the button 174 now in the position of button 176 as in FIG. 6 and cams the finger 190 outwardly in a clockwise direction for disengagement from the moveable member 160. The clutch assembly 164 prevents retrograde movement of the rotatable member 160 as the finger 190 disengages from the button 174. In such manner, as each workpiece station 132 is located adjacent the tool 138 for operation thereby, one of the buttons 168-178 is disposed in aligned relation with the reference button 148 to limit the leftward movement of the tool 138 into the piece 136. Since each button 168-178 may be properly dimensioned for its corresponding workpiece station, the indexing error in the machine may be taken up and the workpieces are provided with more precise and uniform operation by the same tool 138.

Thus, a variable positioning device is provided for multiple station machine operation which eliminates the tolerance stack-up and wear problems in the mechanism for moving the workpiece stations into proper position for tool operation. The structure permits individualized dimensioning of the control buttons such that each workpiece station has the proper tool limiting means to allow for index error. The device is relatively simple in its assembly and in its operation and may be easily mounted on existing production machines. The overall result is a more precise production manufacture ability and the workpieces turned out by the machine are more uniform and with less tolerance requirements.

Having thus described the invention, I claim:

1. In a machine having a frame and a moveable table mounted on said frame and having a plurality of workpiece carrying stations and moveable to serially locate said stations adjacent a tool mounted on a slide on said frame for operation on a workpiece at said adjacent station, variable positioning means for permitting movement of said tool a predetermined distance relative to the workpiece at each of said adjacent stations and comprising:

a rotatable member mounted on said frame and being in fixed location relative to each of said workpiece carrying stations when each of said stations is positioned adjacent said tool;

a plurality of buttons secured in said rotatable member, said plurality being such as to provide one button for a corresponding workpiece mounted on said table for operation by said tool, each of said buttons having an engaging face;

a button carrier fixedly mounted on said slide and in fixed location relative to said tool and moveable with said slide and said tool;

a reference button extending from said button carrier and having an engaging face in the direction of said rotatable member and engageable in face to face relation with the engaging face of one of said plurality of buttons when operation on the corresponding workpiece is completed by said tool;

means for indexing said rotatable member to place a next workpiece corresponding button adjacent said reference button to limit the movement of said slide and said tool relative to said next corresponding workpiece;

and means for preventing retrograde movement of said rotatable member when said member is rotated by said indexing means;

each of said plurality of buttons being independently sized in the direction of said reference button to independently limit the movement of said slide and said tool relative to the workpiece corresponding thereto.

2. The variable positioning means set forth in claim 1 wherein said means for indexing said rotatable member includes a finger slidably and rotatably mounted relative to said frame and engageable with a first button of said plurality of buttons, and means for moving said finger against said first button to rotate said rotatable member and locate another of said plurality of buttons adjacent said reference button, said finger having an inclined face thereon engageable with a second and next adjacent button of said plurality of buttons to said first button, said inclined face causing rotation of said finger out of engagement with said second button when said finger is moved away from said first button.

3. The variable positioning means set forth in claim 2 wherein said means for moving said finger includes an hydraulic cylinder and piston assembly operably connected to said finger and adapted to be operated with movement of said moveable table.

4. The variable positioning means set forth in claim 2 wherein said means for preventing retrograde movement of said rotatable member includes a second finger rotatably mounted on said frame and having an inclined surface engageable by one button of said plurality of buttons and another surface engageable by a next adjacent button to said one button, said second finger being rotated out of engagement by said one button moving against said inclined surface upon rotation of said rotatable member by said finger, and said second finger returning to a position with said other surface engaging said one button to prevent reverse rotation of said rotatable member when said finger is moved away from said first button.

5. The variable positioning means set forth in claim 2 wherein said means for preventing retrograde movement of said rotatable member includes clutch means operatively connected to said rotatable member and actuatable to prevent reverse rotation of said rotatable member when said finger is moved away from said first button.

6. In a machine having a frame and a moveable table mounted on said frame and having a plurality of workpiece carrying stations and moveable to serially locate said stations adjacent a tool mounted on a slide on said frame for operation on a workpiece at said adjacent station; variable positioning means for permitting movement of said tool a predetermined distance relative to each of said workpieces at said adjacent stations and comprising:

reference means mounted on said slide and in fixed location relative to said tool;

means mounted on said frame and having a plurality of positions corresponding to each of said workpiece carrying stations and being in fixed location relative to each of said stations when each of said stations is adjacent said tool, said means mounted on said frame being serially moveable for engagement by said reference means when said tool has completed operation on said workpiece at said adjacent station for limiting the movement of said tool and said slide into said adjacent workpiece;

and means adapted to be connected for movement with said moveable table for moving said means mounted on said frame to each of said plurality of positions when a corresponding workpiece carrying station is moved adjacent said tool to limit movement of said tool a predetermined amount for each of said positions.

7. The variable positioning means set forth in claim 6 wherein said reference means includes a carrier mounted on said slide and a reference button mounted in said carrier, said button having a face adapted to engage said means mounted on said frame.

8. The variable positioning means set forth in claim 7 wherein said means mounted on said frame includes a pluraliity of buttons, each of said buttons corresponding to one of said workpiece stations and having a face engageable by said face on said reference button when said tool has completed operation at said workpiece station.

9. The variable positioning means set forth in claim 8 wherein each of said buttons is of a dimension for face engagement with said face on said reference button to take up variances in movement of said slide toward each of said workpiece stations.

10. The variable positioning means set forth in claim 8 wherein each of said buttons engageable by said reference button is independently dimensioned for independently limiting movement of said slide and said tool into each of said workpieces.

11. The variable positioning means set forth in claim 8 wherein said means for moving said means mounted on said frame includes a reciprocable member engageable with one of said buttons and reciprocable from a first position to a second position to move said means mounted on said frame to place a button adjacent said reference button corresponding to the workpiece station positioned for operation by said tool.

12. The variable positioning means set forth in claim 11 wherein said means for moving said means mounted on said frame further includes means for disengaging said reciprocable member from any of said buttons when said reciprocable member is returned to said first position.

13. The variable positioning means set forth in claim 12 and further including means to prevent retrograde movement of said means mounted on said frame when said reciprocable member is moved from said second position to said first position.

14. The variable positioning means set forth in claim 12 wherein said reciprocable member is mounted on said frame for pivotal movement.

15. The variable positioning means set forth in claim 14 wherein said reciprocable member has an inclined surface thereon adapted to engage one of said buttons upon movement from said second position toward said first position to rotate said member out of engagement with said one of said buttons.

* * * * *